May 25, 1965 J. A. PETROCELLI 3,184,953
GAS CHROMATOGRAPHIC APPARATUS
Filed Dec. 27, 1961 2 Sheets-Sheet 1
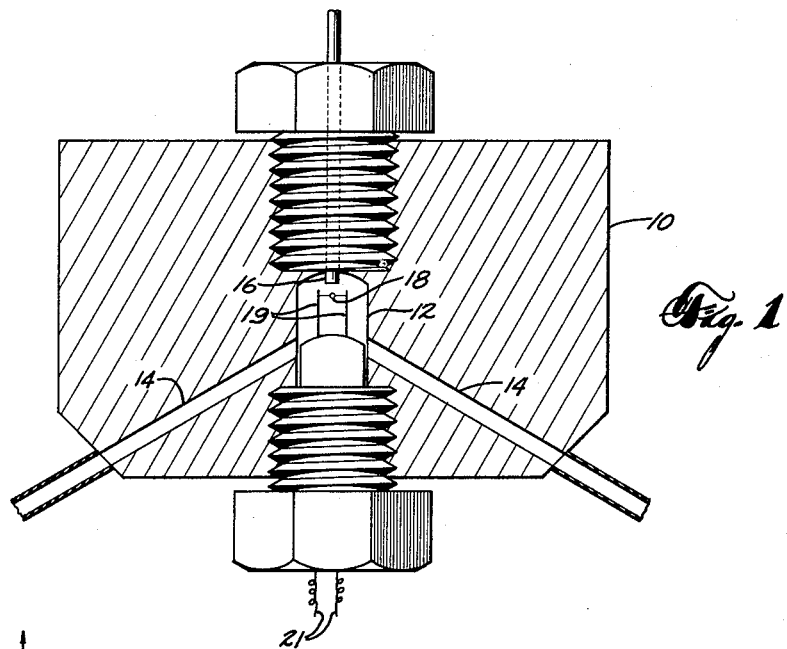
Fig. 1
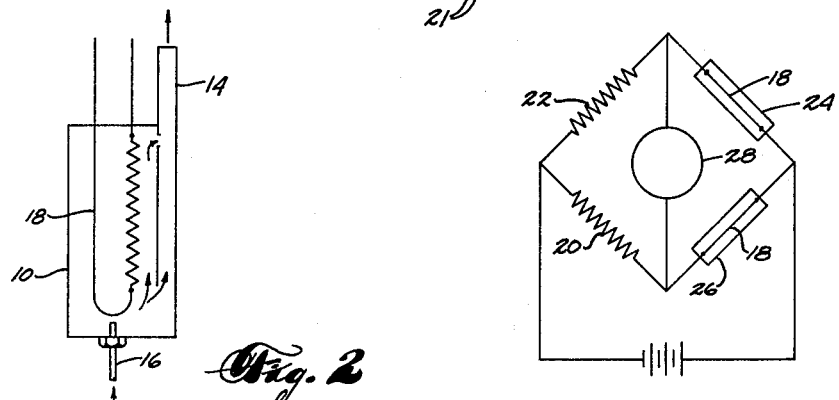
Fig. 2
Fig. 3
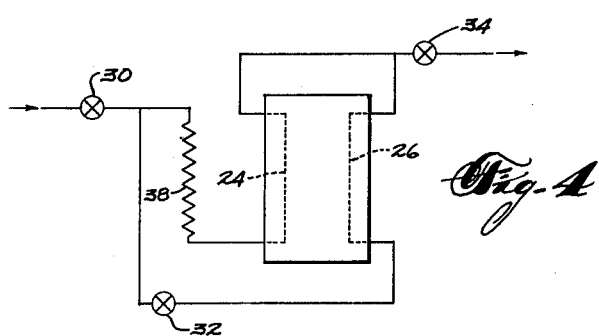
Fig. 4
INVENTOR.
JAMES A. PETROCELLI
BY
ATTORNEY

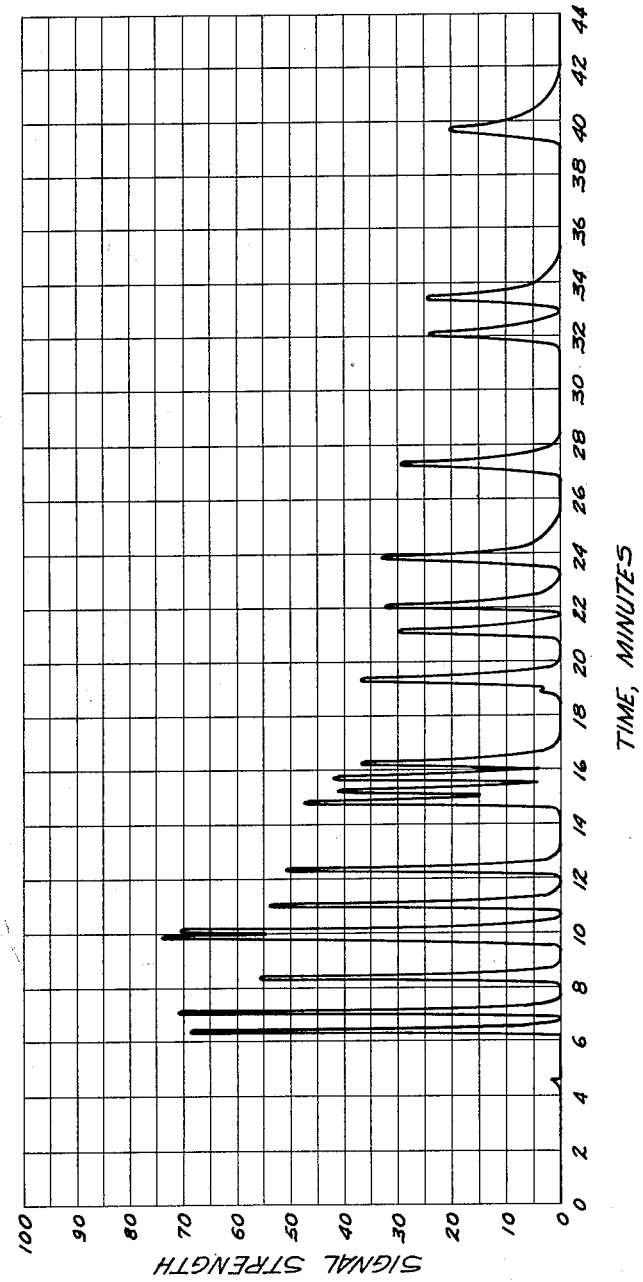

United States Patent Office 3,184,953
Patented May 25, 1965

3,184,953
GAS CHROMATOGRAPHIC APPARATUS
James A. Petrocelli, North Versailles Township, Allegheny County, Pa., assignor to Gulf Research & Development Company, Pittsburgh, Pa., a corporation of Delaware
Filed Dec. 27, 1961, Ser. No. 162,536
14 Claims. (Cl. 73—23.1)

This invention relates to an improved thermal conductivity detector, and more particularly, to a thermal conductivity detector capable of faithfully sensing and indicating the high degree of resolution normally obtained by capillary chromatographic columns.

Capillary chromatographic columns, comprising cylindrical tubes of capillary or near capillary size, having their inside walls coated with an absorbing liquid, are frequently employed to separate the components of a sample of mixed feed charged thereto where a very high degree of resolution of components is important. Although thermal conductivity cells have been found adequate when used to detect the resolution obtained in packed columns, such cells have not been found to be fully satisfactory to detect the resolution achieved by capillary chromatographic columns, as conventional thermal conductivity cells are not sufficiently responsive to indicate the high degree of resolution obtained by capillary columns.

To overcome this difficulty, it has been customary to employ so-called hypersensitive detection methods based on the detection of ionization by the resolved components. For example, beta-ionization detectors have been widely used for detection of products separated in capillary chromatographic columns. Ionization detectors depend upon the detection of the degree of ionization of molecules of the eluted, separated components, such ionization being induced by the absorption of energy from an external energy source. In the instance of beta-ionization, ionization of eluted molecules is induced by absorption of energy from a rare gas, such as helium, argon, or neon, that has been previously irradiated with a beta-radiation source, such as strontium 90. Unfortunately, ionization detectors have not proved ideally suited for purposes of quantitative analysis by capillary chromatographic columns, as the amount of ionization induced and detected can vary not only with the concentration of the material present in the detector, but also with the nature of the material present. Also, ionization detectors and their associated electrical equipment are substantially more expensive than thermal conductivity detectors.

The present invention relates to a sensitive thermal conductivity detector that is responsive commensurately with the high degree of resolution achieved by capillary chromatographic columns and that is more nearly independent of the nature of the substances subjected to analysis than previously employed hypersensitive detectors. The cell structure of this invention includes as its basic components a heat absorbing body enclosing a hollow gas detecting chamber therein, which chamber is provided with a gas outlet spaced apart from a gas inlet, and having an electrical resistance element positioned therein and spaced apart from the walls thereof. It has been found that greatly improved responsiveness is obtainable in cells having such structure by utilizing capillary tubing as the gas inlet to the gas detection chamber of the cell, such capillary tube gas inlet being adapted to form a direct connection between the discharge end of a capallary chromatographic column with the gas detection chamber of the thermal conductivity cell. Although a substantial improvement can be obtained merely by the use of a capillary tube gas inlet adapted to form a direct capillary tube connection between the gas detection chamber of the thermal conductivity cell and the discharge end of the capillary chromatographic column, a still greater improvement in cell response is obtainable by also positioning the discharge orifice of the capillary tube gas inlet so that it is spaced apart from an electrical resistance element within the gas detection chamber by a very small distance such that diffuison of gas away from the axis of flow prior to contact with the resistance element is kept small. Excellent results are obtainable by spacing the discharge orifice of the capillary gas tube inlet apart from the resistance element by a distance of about one to four times the capillary diameter when using capillaries whose inside diameter is in the range of about 0.01 to 0.02 inch, but other spacings, up to as much as about 12 times the diameter of the capillary tube gas inlet, depending on the diameter of the capillary tube, can be used. The electrical resistance element should be sufficiently close to the axis of flow from the discharge orifice of the gas inlet tube that at least a major portion of the resistance element will be within the included angle of the zone of gas discharge from the discharge orifice. Thermistor electrical resistance elements are preferred because the sensitivity of these resistors is sufficiently great to detect the very small concentrations of impurities in the carrier gas that frequently are encountered in capillary chromatography. However, conventional resistors have utility in principle, especially at relatively elevated temperatures, and where the component concentrations in the carrier gas being dealt with are relatively large.

Referring briefly to the various figures of drawing, in which like numerals indicate the same or similar elements, FIGURE 1 is an enlarged front elevation, partly in vertical section, of a preferred thermal conductivity cell structure for purposes of the present invention. FIGURE 2 is a schematic representation of an alternate modification involving somewhat different cell geometry and a relatively less sensitive type of electrical resistance element. FIGURE 3 is a schematic view illustrating the circuitry of a differential katharometer of the kind in which the detectors of the present invention can be utilized. FIGURE 4 is a schematic representation of a combination of a capillary chromatographic column and a differential katharometer. FIGURE 5 is a reproduction of a recording chart obtained in the separation of a mixture of hydrocarbon components in a capillary chromatographic column, using a thermal conductivity cell constructed in accordance with this invention, which chart illustrates detection of separated components commensurate with the degree of resolution in the column.

The use of a capillary tube gas inlet forming a direct, capillary connection between the gas detection chamber of the thermal conductivity cell and the outlet of the capillary column is important for purposes of the present invention, as such use minimizes remixing of components previously separated in the capillary column, by diffusion, prior to introduction thereof into the gas detection chamber of the cell, whereby the response of the detector to the components as separated by the column is more sharply defined. The expressions "capillary column," "capillary tube" and the like are used in their conventional sense to indicate tubes of very small inside diameter and defining essentially a single attenuated channel of substantially uniform diameter. Capillary tubes useful as capillary gas tube inlets for the thermal conductivity detectors of this invention can be of any size suitable for use as capillary chromatographic columns. Tubes having an inside diameter of about 0.01 to about 0.02 inch are customarily used for the latter purpose as a practical matter and are therefore preferred for purposes of the present invention. However, capillary tubes of greater or lesser size can be used. For example, capillary tubes having inside diameters as small as 0.006 inch and as large as 0.055 inch have been successfully used in capillary chromatographic columns and can be used as the gas inlet tubes of the present invention with good results. The capillary tubes employed as gas inlets to the detectors of this invention can be formed from any suitable material that is inert to the mixtures of carrier gases to be passed therethrough. Metal tubes are preferred as the preparation of gas-tight joints is facilitated thereby. Metals that have relatively low coefficients of thermal conductivity are especially preferred to minimize side effects on the signal emitted by the detector. An example of a material of this kind is stainless steel, but other materials, including non-metals such as nylon can be used.

The discharge orifice of the capillary gas inlet tube can be spaced apart from the electrical resistance heating element at any suitable distance that is sufficiently small to minimize or eliminate significant diffusion of the components away from the axis of flow from the discharge orifice, after discharge from the inlet tube and before contact with the resistance element. Detector response comparable to that obtained with ionization detectors has been obtained by spacing the discharge orifice from the electrical resistance heating element by about one millimeter, or four times the inside diameter of the particular capillary gas tube inlet employed. Some further improvement in response may be obtained by still closer spacing say, as low as 0.25 mm., or one capillary diameter, as outward diffusion of the gaseous components away from the flow axis will be still further minimized thereby. Although it is preferred to keep the spacing between the discharge orifice of the gas inlet tube and the electrical heating resistance element as small as possible, so as to diminish and keep to a small amount the outward diffusion of the eluted components away from the flow axis of the discharge orifice of the inlet tube prior to contact with the resistor, that is, not more than four or five times the capillary diameter, some improvements can be obtained by the use of greater spacings of up to two millimeters or more. For example, when using a capillary tube having an inside diameter of 0.006 inch, good results can be obtained by the use of spacings as great as 10 to 12 times the inside diameter of the tube. On the other hand, when using capillary inlet tubes of 0.055 inch, I.D. spacings as small as 1 to 1.5 times the capillary diameter are to be desired.

The electrical resistance element of the present invention can be formed from any conventional material for the purpose and can be of any conventional configuration, insofar as the principle of the present invention is concerned. However, in view of small sized samples employed in capillary chromatographic columns and the resultant small absolute concentrations of eluted components in the carrier gas stream passed into the gas detection chamber, it is important that highly sensitive resistors be employed for best results. Thermistor resistors are suitable for the purpose. Thermistors, as is known, are resistors with a high negative temperature coefficient of resistance. More particularly, they are hard, ceramic-like semiconductors—usually composed of sintered mixtures of oxides of metals such as manganese, nickel, cobalt, copper, uranium, iron, zinc, titanium, and magnesium—whose resistance increases greatly with decreasing temperature, and vice versa, which behavior is in direct contrast to conventional resistors, which have a relatively small, positive temperature coefficient. Thermistors can be obtained in a variety of shapes and sizes, including discs, washers, rods and beads. Any of these shapes can be used in the present invention, provided other considerations are also met, but the bead shape is preferred because of the small surface area involved. Thermistor beads suitable for the purposes of this invention are commercially available in sizes of 0.006 to 0.10 inch in diameter, and from 0.010 to 0.125 inch in length. As indicated, however, the invention is not limited in principle to thermistor elements, and other conventional thermal conductivity cell resistance elements, such as platinum or tungsten filaments, can be employed and may even be preferred at substantially elevated temperatures of about 300° C. or above. Regardless of the type of resistance element employed, the resistor should be positioned either along or sufficiently close to the axis of flow from the discharge orifice of the capillary tube gas inlet as to be within the included angle of the cone of gas discharge from said discharge orifice.

Thermal conductivity cells of any conventional size can be somewhat improved for purposes of the present invention by the use of a capillary gas tube inlet that is closely spaced from the electrical resistance element and that is directly connectible to the discharge end of a capillary column. However, in order to approach optimum definition of separated components it is desirable that the possibility of remixing of separated components by diffusion within the gas detection chamber be minimized by the use of thermal conductivity cells having gas detection chambers of relatively small volume. The smallest practical volume consistent with proper functioning of the cell is desirable. Excellent results are obtainable with gas detection chamber sizes of the magnitude normally used in conjunction with chromatographic columns of small diameter. The gas detection chamber of the cell can be any suitable shape, excellent results having been obtained with a cylindrically shaped chamber. The heat-absorbing body component of the cell can be constructed of any material having a suitable thermal conductivity coefficient. Brass is an example of an excellent material of construction for the purposes of this invention.

The capillary tube gas inlets of this invention can be coupled to the capillary chromatographic columns with which they are designed to be used by the use of a metal, plastic or like union affording substantial abutment of the inlet orifice of the capillary gas inlet tube and the discharge orifice of the capillary column. Alternatively, the discharge end of the capillary chromatographic column and the capillary gas inlet tube of the thermal conductivity cell detector can be made integral. In such instances, the interior of the gas inlet tube can be coated with an absorbent liquid, if desired, similarly as the interior of the capillary column proper. Regardless of the particular means employed to connect the capillary column and the capillary gas inlet tube, a direct capillary-capillary coupling should be employed, without interposition of any intermediate passageway of substantially larger diameter, so as to avoid remixing of the separated components before introduction thereof into the gas detection chamber of the cell.

Referring now to FIGURE 1 in greater detail, numeral 10 denotes a heat-absorbing body provided with a hollow gas detection chamber 12 substantially geometrically centered therein, said chamber having a pair of gas outlets 14 spaced apart from the capillary gas inlet tube 16, and having a thermistor bead electrical resistance heating element 18 positioned therein and spaced apart from the discharge orifice of the inlet tube 16 by a distance of about four times the capillary tube inside diameter. Electrical current is supplied to thermistor element 18 through thermistor lead wires 19 and 21.

In FIGURE 3 there is shown an electrical circuit for differential thermal conductivity detection. Resistances 20 and 22 are matched resistances of known value, positioned in two of the arms of a Wheatstone bridge circuit. Element 24 indicates a thermal conductivity cell through which the carrier gas and eluted components from a capillary column are passed, and element 26 is a matched thermal conductivity cell through which the carrier gas is passed concurrently as a reference. When the composition of the gases flowing through cells 24 and 26 is identical, the resistance elements 18 in the respective cells will have the same value, and there will be no difference in potential across recording potentiometer 28. As the gas composition flowing through cell 24 varies with respect to that flowing through reference cell 26, a potential difference, varying with the amount of the eluted "impurity" in cell 24, will be recorded by instrument 28.

Referring now to FIGURE 4, valves 30, 32, and 34 refer to valves for establishing flow of carrier gas from a source, not shown, through cells 24 and 26. Absorbed components are eluted from chromatographic column 38 by the carrier gas and the mixtures of carrier gas and eluted components pass through cell 24 in the order in which the components are eluted from the column. The composition of the gas in cell 24 is compared with that in reference cell 26 by a circuit of the kind illustrated in FIGURE 3.

In a specific embodiment, a Gow-Mac micro thermal conductivity cell, Model JDC–015, designed for use in conjunction with a ⅛ inch packed chromatographic column, was modified in accordance with the present invention. The cell comprised a brass heat absorbing body having a cylindrical gas detection chamber therein, said chamber being approximately 9 mm. in depth and having an inside diameter of about 5.5 mm. The gas detection chamber is positioned in approximately the geometric center of the heat absorbing brass block. The cell was also originally provided with a cylindrical gas inlet chamber 10 mm. in diameter, drilled into the outer surface of the block coaxially with the gas detection chamber. The gas detection chamber of the cell as purchased is provided with an axial gas inlet orifice approximately 1.5 mm. in diameter, positioned approximately 2 mm. apart from an axially positioned thermistor bead resistance element, Fenwal G112–9225–A, 8000 ohm glass bead, manufactured by Fenwal, Inc., Ashland, Mass. The gas inlet of the gas detection chamber is at the same time the outlet of the gas inlet chamber. The gas detection chamber was also provided with a pair of tubular gas outlets positioned oppositely from each other in the cylindrical wall of the chamber about 5 mm. apart in elevation from the gas inlet orifice and about 3 mm. apart in elevation from the thermistor element. A stainless-steel capillary gas inlet tube having an inside diameter of 0.01 inch was inserted with slight forcing through the 1.5 mm. orifice separating the gas inlet chamber from the gas detection chamber until the discharge orifice of the tube was approximately 1 mm. or approximately four times the capillary diameter from the thermistor bead. The capillary gas inlet tube was then fixed in place by filling the gas inlet chamber with molten silver solder and allowing the solder to harden. The modified cell was then connected in a differential katharometer of the general kind shown in FIGURE 4, said katharometer having as the reference cell a diffusion-type micro cell of the same geometry as the modified detecting cell prior to its modification, and the capillary gas inlet tube of the modified cell was coupled directly to the outlet of a 191 ft. stainless-steel capillary chromatographic column having its inner walls coated with squalane. A 0.01 microliter sample of a $C_5-C_7$ fraction of saturated hydrocarbons was injected into a helium carrier gas stream flowing through the column at the rate of 1.7 ml./min. in order to separate the components. The carrier gas containing the products in the order eluted was passed through the katharometer described above, and the signal obtained therefrom was recorded. A reproduction of the chromatogram obtained in this fashion is shown in FIGURE 5. As will be seen from the figure, the peaks representing the different components are sharply defined and clearly separated from adjacent peaks. In other words the chromatogram obtained as described was of comparable quality to chromatograms obtained from components separated in a capillary column using a hypersensitive ionization detector such as a beta-ionization detector. In contrast, when a katharometer containing two unmodified Gow-Mac micro cells was employed to detect the resolution obtained with a similar $C_5-C_7$ saturated hydrocarbon fraction using a 200 ft., 0.01 I.D., squalane-coated capillary column, the peaks obtained in the chromatogram were relatively flattened and possessed relatively broad bases, and in many instances were not clearly separated from adjacent peaks, indicating a much poorer resolution of components than was actually obtained by the capillary column.

Numerous modifications of the herein-disclosed invention will suggest themselves to those skilled in the art and can be resorted to without departing from the spirit or scope of the invention. Accordingly, only such limitations should be imposed in the present invention as are contained in the claims appended hereto.

I claim:

1. A thermal conductivity cell, comprising a heat absorbing body enclosing a gas detection chamber therein, said chamber being provided with a capillary tube gas inlet having an inside diameter of about 0.006 to 0.055 inch, said capillary tube gas inlet also having a discharge orifice adapted to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, a thermistor bead electrical resistance element within the gas detection chamber and spaced apart from the walls thereof, at least a major portion of said element being positioned within the included angle of the zone of discharge from the discharge orifice of the capillary tube gas inlet, said resistance element being spaced apart from said discharge orifice by a small distance, about 1 to 12 times the diameter of said capillary tube gas inlet, said small distance being effective to keep small the diffusion of gaseous materials discharged from said orifice away from the axis of flow prior to contact with said resistance element.

2. The apparatus of claim 1 including in combination a capillary chromatographic column having its discharge end directly connected to said capillary tube gas inlet.

3. A thermal conductivity cell comprising a heat absorbing body enclosing a gas detection chamber therein, said chamber being provided with a capillary tube gas inlet having an inside diameter of about 0.01 to 0.02 inch, said capillary tube gas inlet having a discharge orifice arranged to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, a thermistor bead electrical resistance element within the gas detection chamber and spaced apart from the walls thereof, said resistance element being spaced apart from said discharge orifice by a small distance, in the range of about 1 to 4 times the diameter of the capillary tube gas inlet and less than 2 millimeters.

4. The apparatus of claim 3 including in combination a capillary chromatographic column having its discharge end connected directly to said capillary tube gas inlet.

5. A thermal conductivity cell, comprising a heat absorbing body enclosing a gas detection chamber therein, said chamber being provided with a capillary tube gas inlet having an inside diameter of about 0.006 to 0.055 inch, said capillary gas tube inlet also having a discharge orifice adapted to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, a single electrical resistance element within said gas detection chamber and spaced apart from the walls thereof, at least a portion of said element being positioned within the included angle of the zone of discharge from the discharge orifice of the capillary tube gas inlet, said resistance element being spaced apart from said discharge orifice by a small distance about 1 to 12 times the diameter of said capillary tube gas inlet, said small distance being effective to keep small the diffusion of gaseous materials discharged from said orifice away from the axis of flow prior to contact with said resistance element.

6. The apparatus of claim 5 including in combination a capillary chromatographic column having its discharge end directly connected to said capillary tube gas inlet.

7. The apparatus of claim 5 where the capillary tube gas inlet has an inside diameter of about 0.01 to 0.02 inch and said small distance is about 1 to 4 times the capillary diameter.

8. A thermal conductivity cell, comprising a heat absorbing body enclosing a gas detection chamber therein, said chamber being provided with a capillary tube gas inlet having an inside diameter of about 0.006 to 0.055 inch, said capillary tube gas inlet also having a discharge orifice adapted to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, a single thermistor bead electrical resistance element within said gas detection chamber and spaced apart from the walls thereof, at least a major portion of said element being positioned within the included angle of the zone of discharge from the discharge orifice of the capillary tube gas inlet, said resistance element being spaced apart from said discharge orifice by a small distance, about 1 to 12 times the diameter of said capillary tube gas inlet, said small distance being effective to keep small the diffusion of gaseous materials discharged from said orifice away from the axis of flow prior to contact with said resistance element.

9. The apparatus of claim 8 including in combination a capillary chromatographic column having its discharge end directly connected to said capillary tube gas inlet.

10. The apparatus of claim 8 where the capillary tube gas inlet has an inside diameter of about 0.01 to 0.02 inch and said small distance is about 1 to 4 times the capillary diameter and less than 2 millimeters.

11. Combination apparatus, comprising a capillary chromatographic column, a heat absorbing body enclosing a gas detection chamber therein, said chamber being provided with a capillary tube gas inlet having an inlet end connected directly to the discharge end of said capillary chromatographic column and a discharge orifice adapted to discharge into said gas detection chamber, said gas detection chamber also being provided with a gas outlet spaced apart from the discharge orifice of said capillary tube gas inlet, an electrical resistance element within the gas detection chamber and spaced apart from the walls thereof, at least a major portion of said element being positioned within the included angle of the zone of discharge from the discharge orifice of the capillary tube gas inlet, said resistance element being spaced apart from said discharge orifice by a small distance, effective to keep small the diffusion of gaseous materials discharged from said orifice away from the axis of flow prior to contact with said resistance element.

12. A thermal conductivity cell, comprising a heat absorbing body enclosing a gas detection chamber therein, said chamber being provided with a capillary tube gas inlet having an inside diameter of about 0.006 to 0.055 inch, and having a discharge orifice adapted to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, an electrical resistance element within the gas detection chamber and spaced apart from the walls thereof, at least a portion of said element being positioned within the included angle of the zone of discharge from the discharge orifice of the capillary tube gas inlet, said resistance element being spaced apart from said discharge orifice by a small distance, in the range of about 1 to 12 times the capillary diameter, effective to keep small the diffusion of gaseous materials discharged from said orifice away from the axis of flow prior to contact with said resistance element.

13. A thermal conductivity cell, comprising a heat absorbing body enclosing a gas detection chamber therein, said chamber being provided with a capillary tube gas inlet having an inside diameter of about 0.01 to 0.02 inch, and having a discharge orifice adapted to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, an electrical resistance element within the gas detection chamber and spaced apart from the walls thereof, at least a portion of said element being positioned within the included angle of the zone of discharge from the discharge orifice of the capillary tube gas inlet, said resistance element being spaced apart from said discharge orifice by a small distance, in the range of about 1 to 4 times the capillary diameter, effective to keep small the diffusion of gaseous materials discharged from said orifice away from the axis of flow prior to contact with said resistance element.

14. A thermal conductivity cell, comprising a heat absorbing body enclosing a gas detection chamber therein, said chamber being provided with a capillary tube gas inlet having a discharge orifice adapted to discharge into said chamber, said capillary tube gas inlet being adapted to form a direct capillary connection between said gas detection chamber and the discharge end of a capillary chromatographic column, said gas detection chamber also being provided with a gas outlet spaced apart from the discharge orifice of said capillary tube gas inlet, a thermistor bead electrical resistance element within the gas detection chamber and spaced apart from the walls thereof, at least a major portion of said element being positioned within the included angle of the zone of discharge from the discharge orifice of the capillary tube gas inlet, said resistance element being spaced apart from said discharge orifice by a small distance, effective to keep small the diffusion of gaseous materials discharged from said orifice away from the axis of flow prior to contact with said resistance element.

References Cited by the Examiner

UNITED STATES PATENTS

| | | | |
|---|---|---|---|
| 2,509,889 | 5/50 | Shockley | 73—204 |
| 2,926,520 | 3/60 | Schmacht | 73—27 |

FOREIGN PATENTS

| | | |
|---|---|---|
| 1,238,716 | 6/60 | France. |

OTHER REFERENCES

Ambrose et al., in Journal of Scientific Instruments, vol. 32, Aug. 1955, page 323.

Sasaki et al., in Nature, vol. 186, April 23, 1960, pages 309, 310.

RICHARD C. QUEISSER, *Primary Examiner.*

ROBERT L. EVANS, *Examiner.*